United States Patent [19]
Ohji et al.

[11] Patent Number: 5,363,263
[45] Date of Patent: Nov. 8, 1994

[54] COIL ASSEMBLY FOR ROTARY MAGNETIC HEAD APPARATUS

[75] Inventors: Toshio Ohji, Mito; Juichi Morikawa; Hideo Zama, both of Katsuta, all of Japan

[73] Assignee: Hitachi Ltd., Tokyo, Japan

[21] Appl. No.: 857,314

[22] Filed: Mar. 25, 1992

[30] Foreign Application Priority Data

Apr. 19, 1991 [JP] Japan .................... 3-088098

[51] Int. Cl.$^5$ ............................. G11B 5/52
[52] U.S. Cl. ....................... 360/108; 360/84; 360/130.24
[58] Field of Search ............... 360/108, 84, 130.24

[56] References Cited

U.S. PATENT DOCUMENTS

| | | | |
|---|---|---|---|
| 3,911,486 | 10/1975 | Hibbard | 360/108 |
| 4,609,960 | 9/1986 | Fujioka | 360/108 |
| 5,010,432 | 4/1991 | Fukushima et al. | 360/108 |
| 5,126,906 | 6/1992 | Ohji et al. | 360/108 |

FOREIGN PATENT DOCUMENTS

| | | | |
|---|---|---|---|
| 59-127814 | 7/1984 | Japan | 360/108 |
| 62-271406 | 11/1987 | Japan | 360/108 |
| 63-080510 | 4/1988 | Japan | 360/108 |
| 02009106 | 1/1990 | Japan | 360/108 |
| 02273907 | 11/1990 | Japan | 360/108 |

OTHER PUBLICATIONS

National Technical Report, vol. 8, No. 4, Sakata et al, "Design of Rotary Transformer", Aug. 1972, pp. 357–369.

*Primary Examiner*—Stuart S. Levy
*Assistant Examiner*—Paul J. Ditmyer
*Attorney, Agent, or Firm*—Antonelli, Terry, Stout & Kraus

[57] ABSTRACT

A rotary magnetic head apparatus comprises a transformer core, including a rotor core and a stator core, a rotary drum, a stationary drum, and magnetic heads provided in the outer peripheral portion of the rotary drum. Signal transmission coils are disposed in a plurality of grooves formed concentrically in a surface of the core to transmit signals to and from the magnetic heads. Windings of each of the coils are positioned and lined with a flexible insulating layer so as to keep their mutual positional relation unchanged. The insulating layer is removed from the coil at portions corresponding to starting and terminating ends of the winding thereof. The insulating layer is bonded to the bottoms of the grooves. Through holes are formed in the core at positions corresponding to the starting and terminating end portions of the windings of the coil. Conductive junction members extend in the through holes and are electrically connected to the starting and terminating end portions of the windings of the coils to transmit signals to and from the magnetic heads.

11 Claims, 12 Drawing Sheets

COIL ASSEMBLY FOR ROTARY MAGNETIC HEAD APPARATUS

FIELD OF THE INVENTION AND RELATED ART STATEMENT

This invention relates to a rotary magnetic head apparatus which is to be used in a video tape recorder, a digital audio tape recorder and the like.

A rotary magnetic head apparatus generally comprises a rotary transformer which has a transformer core and coils provided on the transformer core.

In a conventional rotary transformer disclosed in Japanese Patent Unexamined Publication No. 62-271406, starting and terminating end portions of the winding of each of coils formed on a flexible insulating member are drawn out from a single through hole formed in a transformer core. In another conventional rotary transformer disclosed in Japanese Patent Unexamined Publication No. 63-80510, external lead wires are connected beforehand to the starting and terminating end portions of the winding of each of the printed coils so as to be taken out from the through holes formed in the transformer core. Further, in still another conventional rotary transformer disclosed in Japanese Patent Unexamined Publication No. 2-9106, the through holes formed in the transformer core are each filled up with a resin before hand so as to hold the lead pins therein. These pins and resin are connected to the starting and terminating end portions of the winding of each of the coils formed by photolithography.

In the case of the rotary transformer disclosed in Japanese Patent Unexamined Publication No. 62-271460, since the starting and terminating end portions of the winding of the coil are drawn out from a single through hole, no reactive inductance is generated, and so there is no possibility that the electric characteristics are deteriorated. However, since the coil conductors are formed on the flexible insulating member, positions of the drawn-out starting and terminating end portions of the winding of each coil are not fixed, and therefore, a considerable number of steps are required in the process of connecting and fixing them to other members. Further, there is a problem that it is difficult to assemble the transformer automatically, using a robot or the like.

In the case of the rotary transformer disclosed in Japanese Patent Unexamined Publication No. 63-80510 as well, positions of the lead wires are not fixed so that the same problems as described above are encountered.

In the case of the rotary transformer disclosed in Japanese Patent Unexamined Publication No. 2-9106, since the injection molding is performed with resin so as to embed the lead pins in the transformer core, a complicated process is required. Further, since the coils must be formed directly in the grooves of the transformer core, and since patterning effected by means of plating, evaporation, sputtering or the like in forming the coils must be performed on the core surface that has stepped portions, the process is considerably complicated.

OBJECT AND SUMMARY OF THE INVENTION

An object of the present invention is to provide a rotary magnetic head apparatus which is free from the deterioration of performance, capable of electrically connecting coils with ease, and capable of being assembled automatically without difficulty.

To this end, there is provided according to the present invention a rotary magnetic head apparatus comprising: a transformer core including a rotor core and a stator core; a rotary drum to which the rotor core is secured; a stationary drum to which the stator core is secured so as to face on the rotor core a magnetic head provided in the outer peripheral portion of the rotary drum; signal transmission coils disposed in a plurality of grooves formed concentrically in a surface of the rotor core and/or the stator core facing the stator core and/or the rotor core and serving to transmit signals to and from the magnetic head, windings of each of the coils being positioned and lined with a flexible insulating layer so as to keep their positional relation unchanged, the insulating layer being removed from each coil at portions corresponding to starting and terminating ends of the winding thereof, and the insulating layer being bonded to the bottoms of the grooves; through holes formed in the transformer core at positions corresponding to the starting and terminating end portions of the winding of each coil of the coils; and conductive junction members extending in the through holes and electrically connected to the starting and terminating end portions of the windings of the coils so as to serve to transmit signals to and from the magnetic head.

DETAILED DESCRIPTION OF PREFERRED EMBODIMENTS

Figure 1:
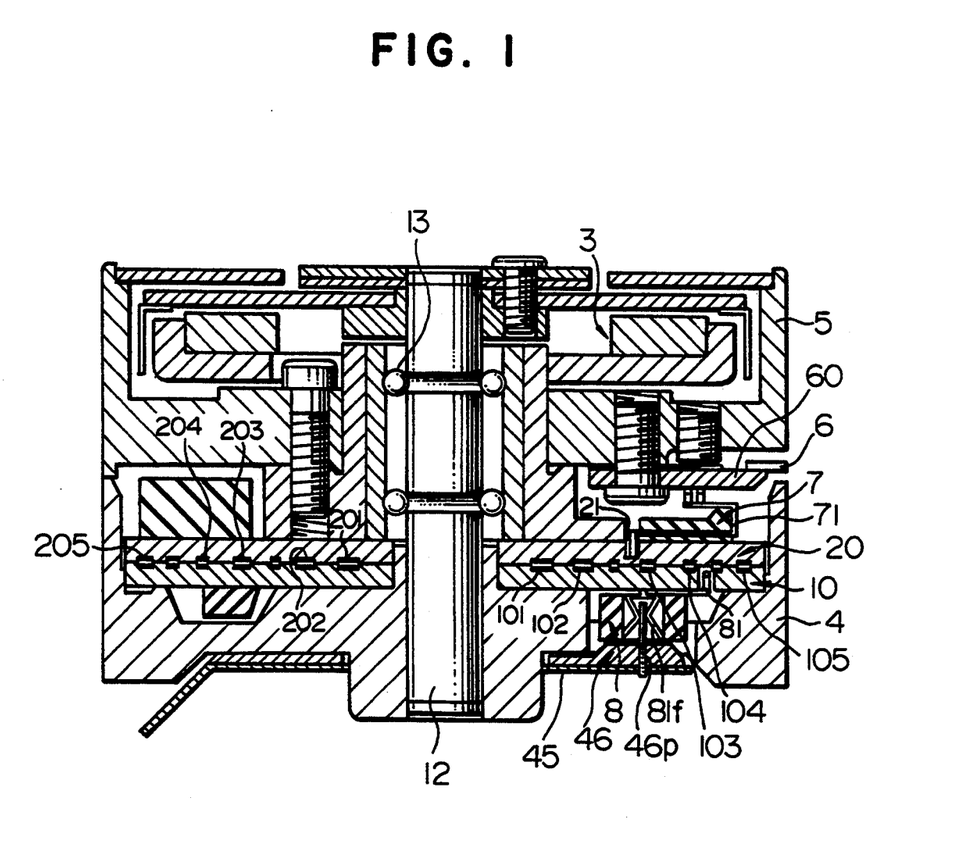
FIG. 1 is a sectional view of a 5-channel rotary magnetic head apparatus according to an embodiment of the present invention.
Figure 2A:
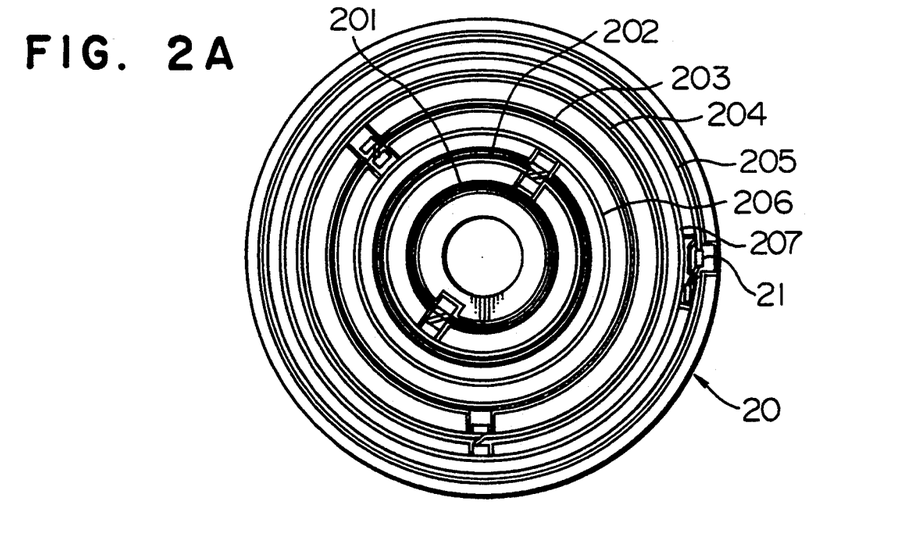
FIG. 2A is a plan view of a rotor of a rotary transformer of the apparatus shown in FIG. 1.
Figure 2B:
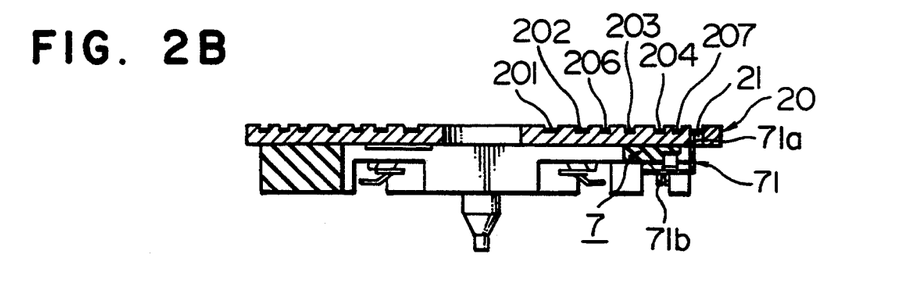
FIG. 2B is a sectional view of the rotor of FIG. 2A.
Figure 2C:
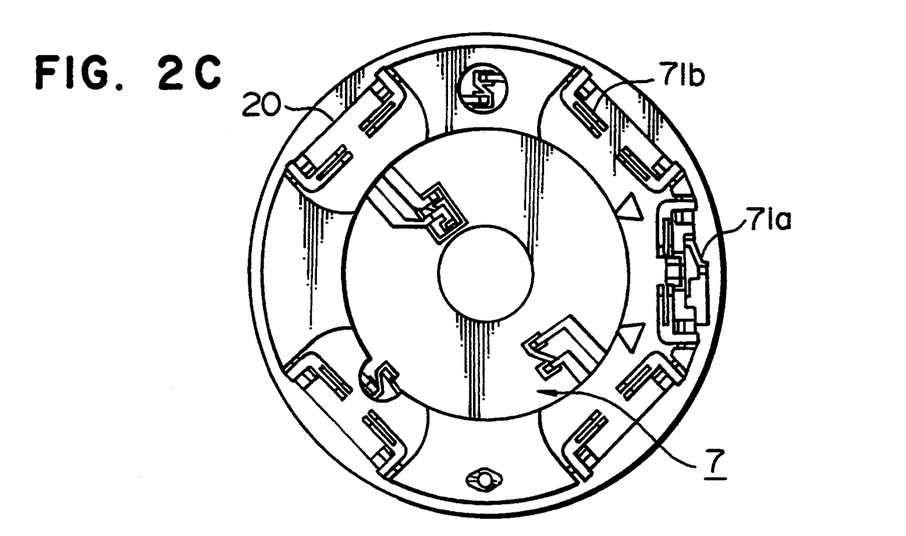
FIG. 2C is a bottom view of the rotor of FIG. 2A.
Figure 3A:
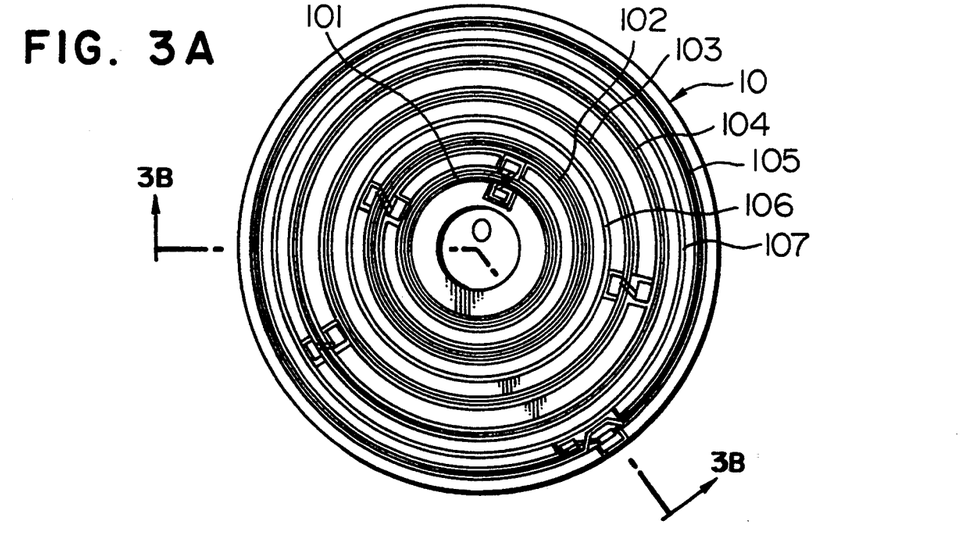
FIG. 3A is a plan view of a stator of the rotary transformer of the apparatus shown in FIG. 1.
Figure 3B:
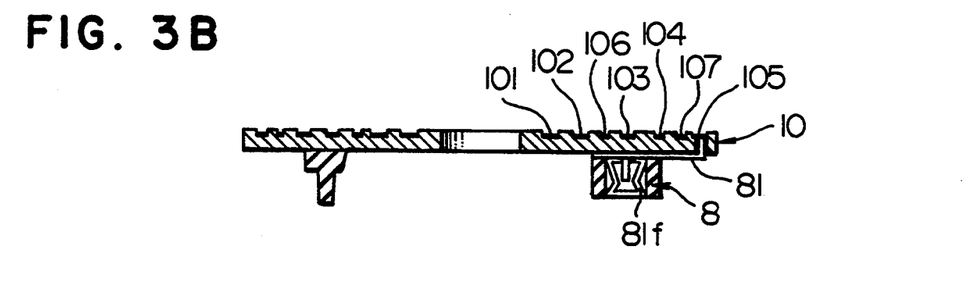
FIG. 3B is a sectional view of the stator taken along the line B-O-B of FIG. 3A.
Figure 3C:
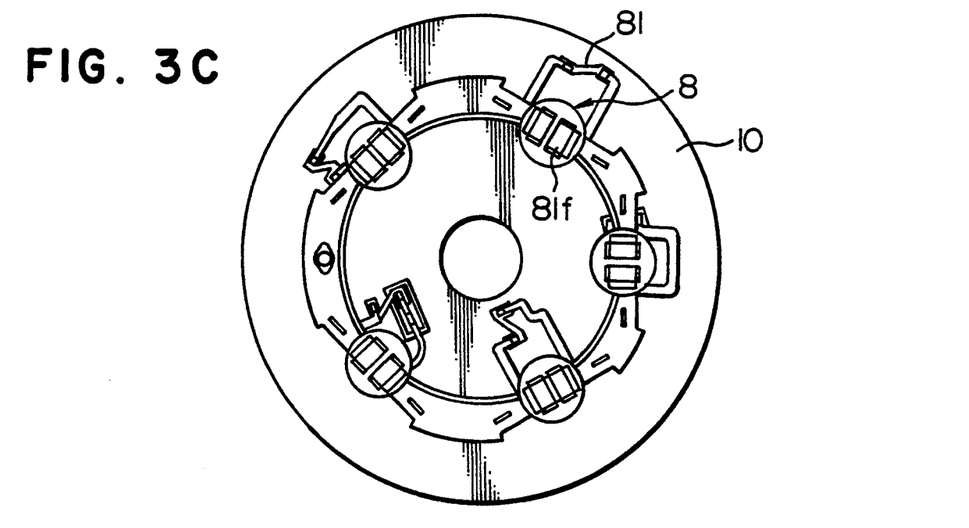
FIG. 3C is a bottom view of the stator of FIG. 3A.
Figure 4A:
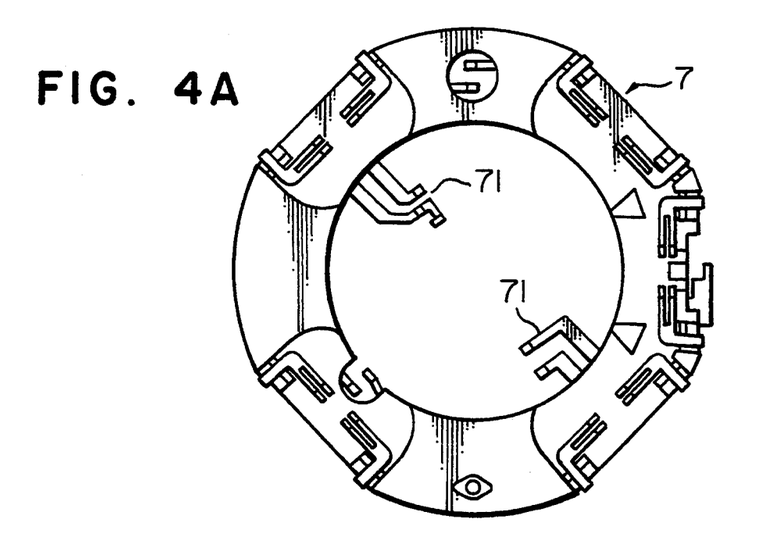
FIG. 4A is a plan view of junction members of the rotor of FIG. 2A.
Figure 4B:
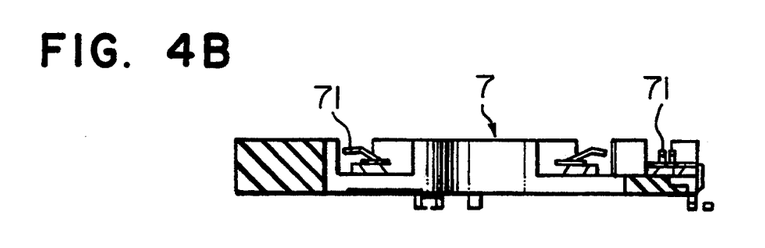
FIG. 4B is a sectional view of the junction members of FIG. 4A.
Figure 4C:
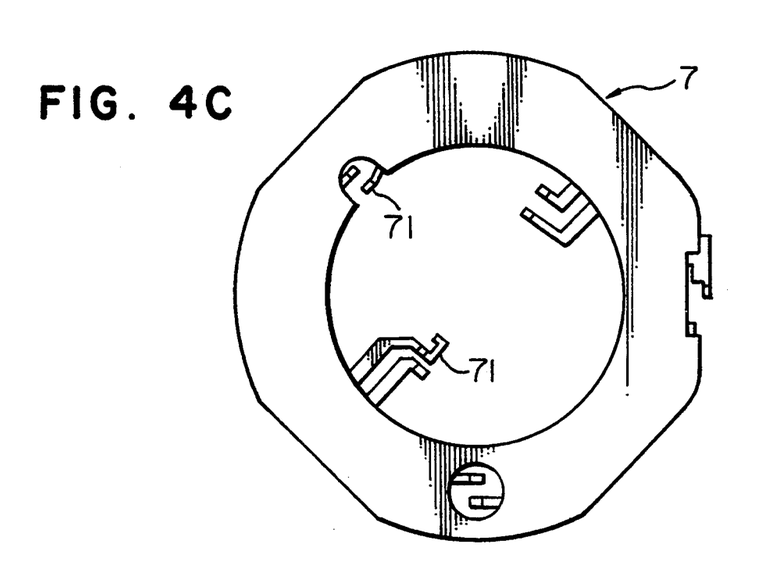
FIG. 4C is a bottom view of the junction members of FIG. 4A.
Figure 5A:
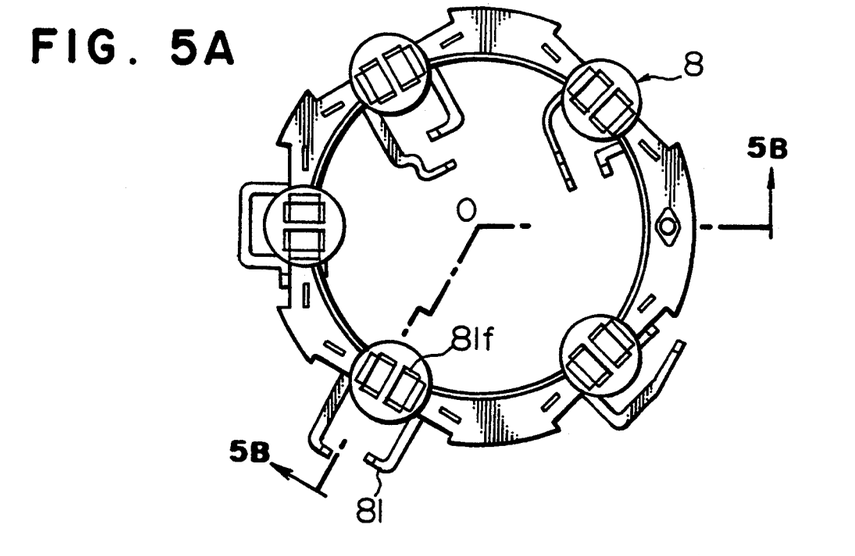
FIG. 5A is a plan view of junction members of the stator of FIG. 3A.
Figure 5B:
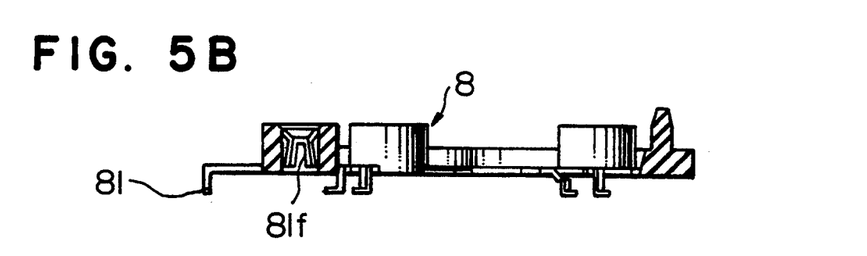
FIG. 5B is a sectional view of the junction members taken along line B-O-B of FIG. 5A.
Figure 5C:
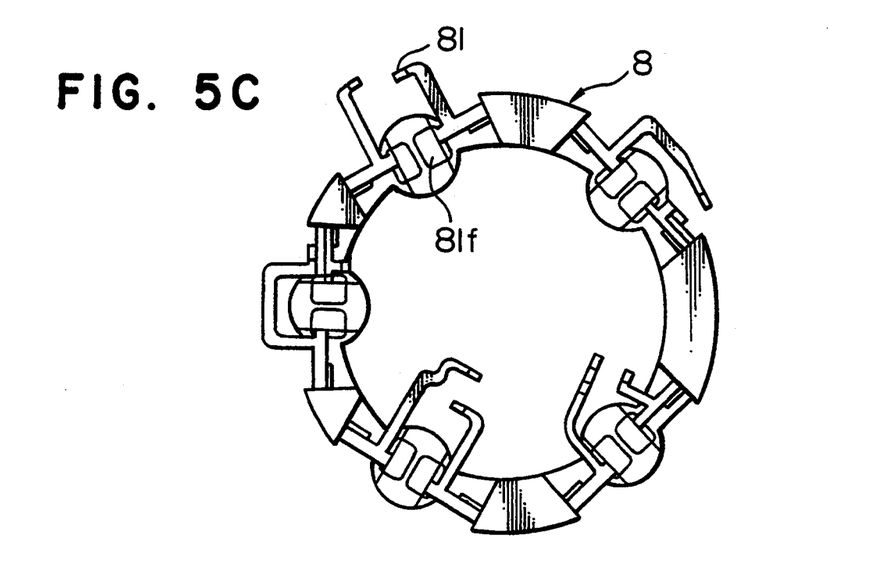
FIG. 5C is a bottom view of the junction members of FIG. 5A.

Referring to FIG. 1, a 5-channel rotary magnetic head apparatus according to an embodiment of the present invention comprises a stationary drum 4, a rotary drum 5, a stationary transformer core (stator core) 10 secured to the stationary drum 4, and a rotary transformer core (rotor core) 20 secured to the rotary drum 5. The stator core 10 has signal transmission coils 101–105 disposed in a surface thereof facing the rotor core 20 and an insulating member 8 (FIGS. 5A–5C) fixed to the other surface thereof for holding a plurality of conductive junction members 81 serving to connect with the signal transmission coils 101–105. Similarly, the rotor core 20 has signal transmission coils 201–205 disposed in a surface thereof facing the stator core 10 and an insulating member 7 (FIGS. 4A–4C) fixed to the other surface thereof for holding a plurality of conductive junction members 71 serving to connect with the signal transmission coils 201–205. One end 81$f$ of each of the junction members 81 of the insulating member 8 is formed as a female connector so that it is combined with a male connector 46 having pins 46$p$, disposed on a flexible printed board 45 provided in the lower portion of the stationary drum 4 so as to be connected to a circuit provided outside of the rotary magnetic head apparatus.

The rotary drum 5 is rotatably supported on a shaft 12 through a bearing 13, while the stationary drum 4 is fixedly secured to the shaft 12. Magnetic heads 6 are provided in the outer peripheral portion of the rotary drum 5. Signals are transmitted to and from the magnetic heads 6 through a rotary transformer which comprises the stator core 10, the rotor core 20 and the signal transmission coils 101–105 and 201–205.

The stator core 10 and the rotor core 20 are each formed with a plurality of concentrical grooves in the surfaces thereof facing each other, in which grooves the coils 101–105 and 201–205, and short-circuit rings 106, 107 and 206, 207 are disposed respectively.

Referring to FIGS. 1 and 2A–2C, the coils 201–205 disposed in the grooves of the rotor core 20 are connected with one end 71$a$ of the junction member 71 of the insulating member 7 within through holes 21 formed in the rotor core 20. The other end 71$b$ of each of the junction members 71 is led in the direction opposite to the surface of the rotor core 20 facing the stator core 10, and bent and brought into elastic contact with a junction board (not shown) on a head base 60 due to its spring force, thereby connecting electrically the junction member 71 to the magnetic head 6.

In an upper portion of the rotary drum 5 a motor 3 is provided to rotatively drive the rotary drum 5.

Next, the process of manufacturing the rotary transformer will be described.

Figure 6A:
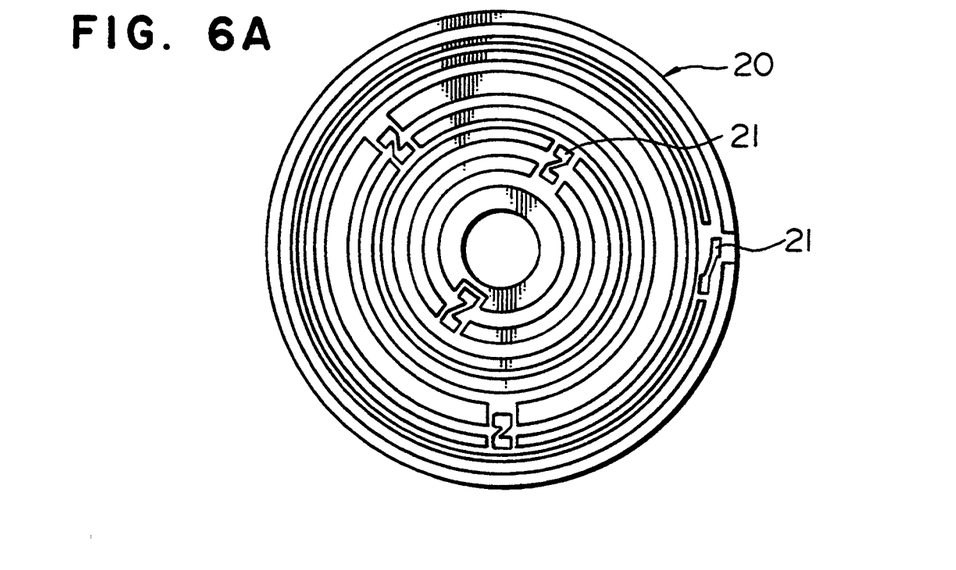
FIG. 6A is a plan view of the rotor of FIG. 2A from which coils are removed.
Figure 6B:
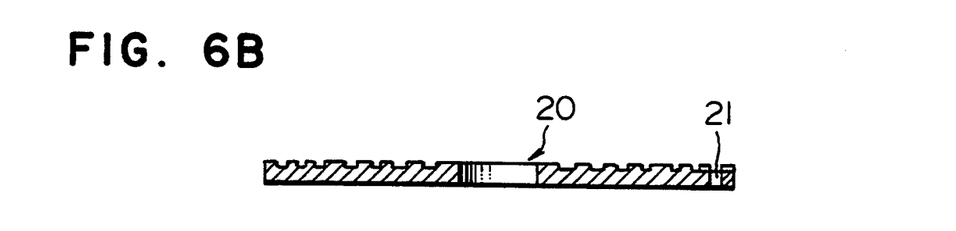
FIG. 6B is a sectional view of the rotor core of FIG. 6A.
Figure 6C:
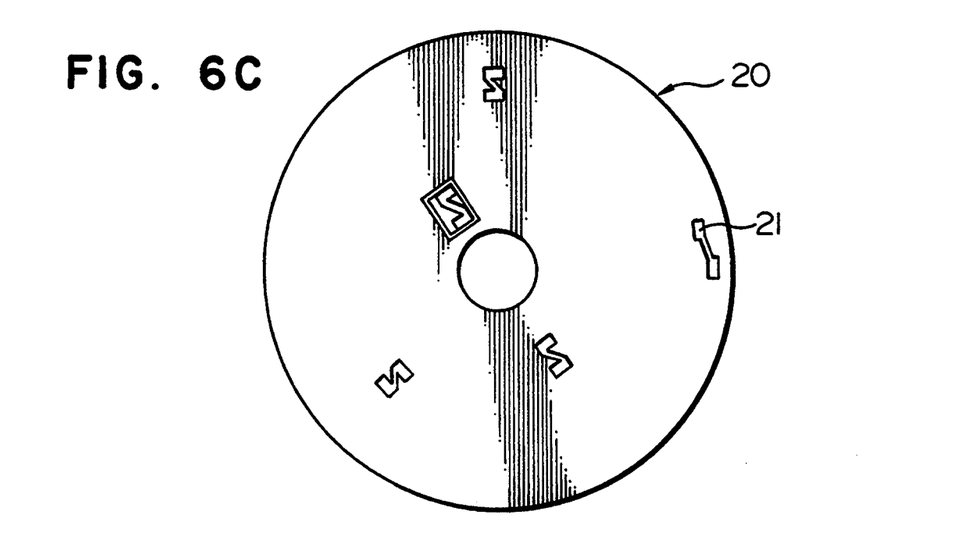
FIG. 6C is a bottom view of the rotor core of FIG. 6A.
Figure 7A:
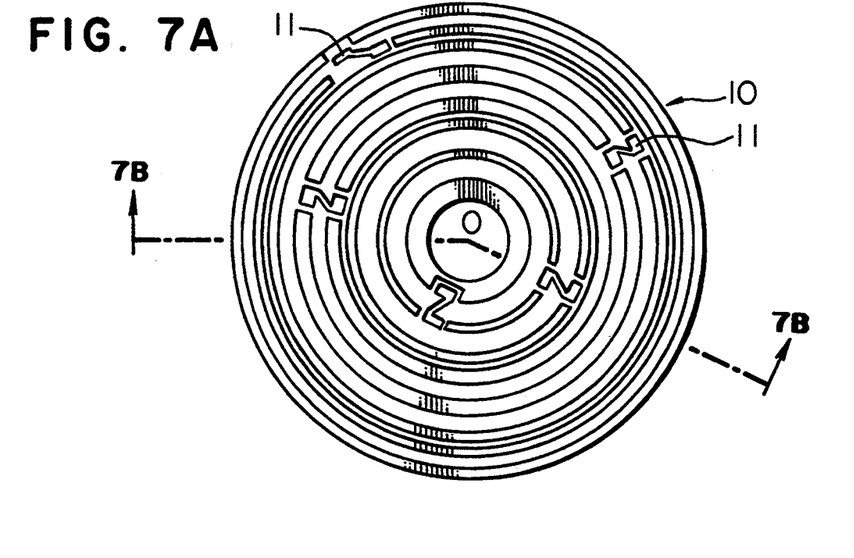
FIG. 7A is a plan view of the stator core of FIG. 3A from which coils are removed.
Figure 7B:
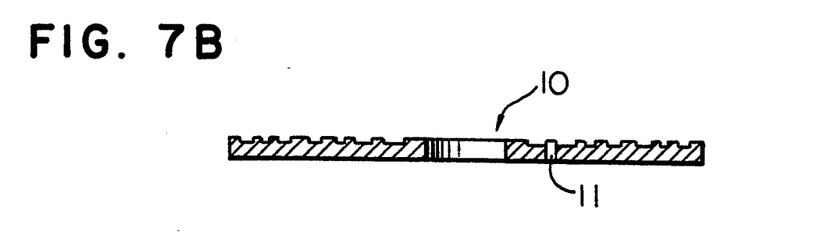
FIG. 7B is a sectional view of the stator core taken along the line B-O-B of FIG. 7A.
Figure 7C:
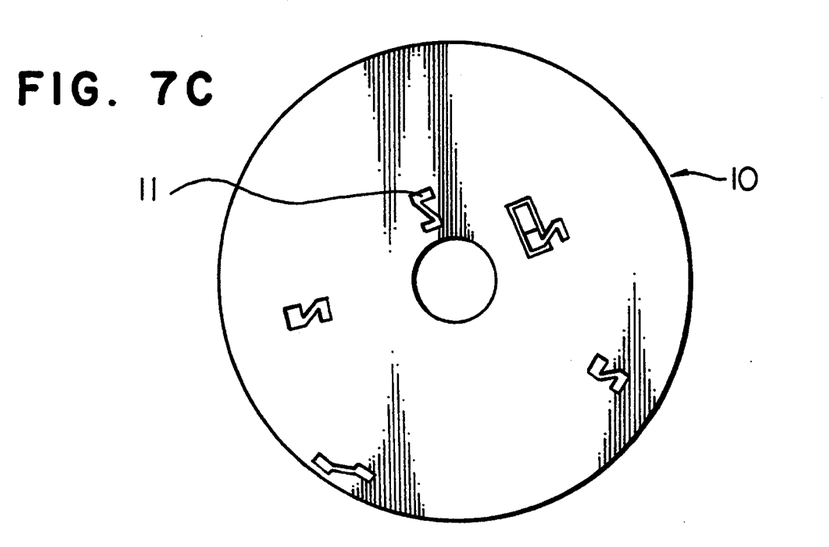
FIG. 7C is a bottom view of the stator core of FIG. 7A.

Referring to FIGS. 2A–2C, 3A–3C and 13A–13I, the signal transmission coils 101–105 and 201–205, which are to be embedded in the grooves of the cores 10 and 20, are formed in the manner described below. Description will be made in connection with the rotor core 20 (FIGS. 6A–6C), and however, it will be understood easily that the signal transmission coils 101–105 are formed in the stator core 10 (FIGS. 7A–7C) in the same manner as occasion demands.

Figure 13A:
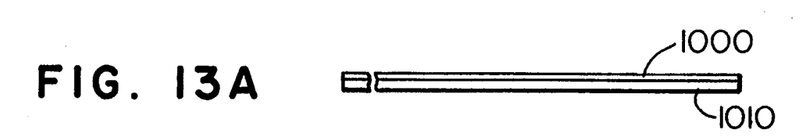
FIGS. 13A-13I are illustrations for explanation of the procedure of mounting the coils on the core.

First, a double-layer base material of an insulating layer 1000 and a Cu layer 1010 is prepared (FIG. 13A). The insulating layer 1000 is made of a high molecular compound such as polyester or polyimide and of a thickness 0.01 mm–0.1 mm, and has flexibility and thermal resistance about 200° C.

Figure 13B:
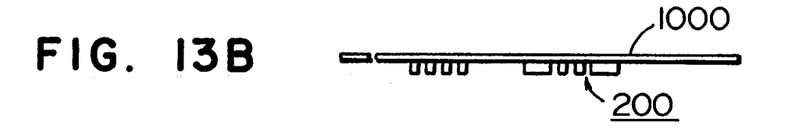
Figure 13C:
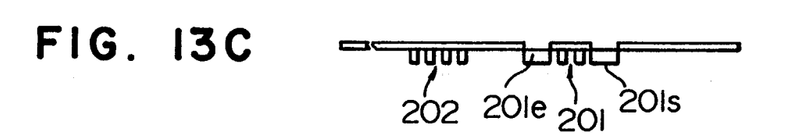
Figure 13D:
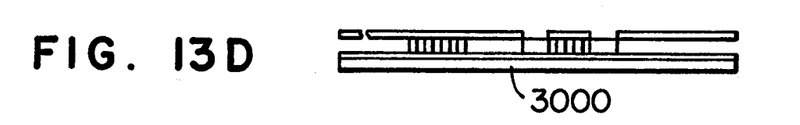

Subsequently, a coil pattern 200 and a short-circuit ring pattern are formed on the Cu layer 1010 photolithography, and unnecessary parts of the Cu layer 1010 are removed (FIG. 13B). Parts of the insulating layer 1000 corresponding to starting and terminating ends 201$s$ and 201$e$ of the winding of each coil 201 are removed (FIG. 13C). Exposed surfaces of the coils 201, 202, 203, 204 and 205 and short-circuit rings 206 and 207 are coated with metal. In FIGS. 13A–13I, only two coils 201 and 202 are shown, but the starting and terminating ends of the winding of the coil 202 are not shown owing to the position of the cross section.

Figures 13E, 13F:
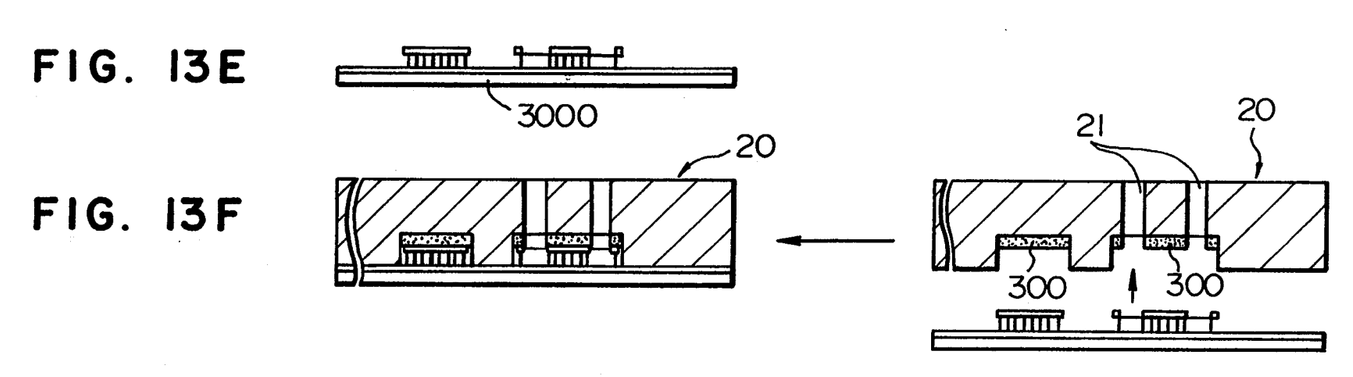

The double-layer base material having the coils formed therein is held by a holding sheet 3000 (FIG. 13D), and unnecessary parts of the flexible insulating layer 1000 are removed (FIG. 13E).

The double-layer base material held by the holding sheet 3000 is positioned relative to the rotor core 20, the grooves of which are each provided with an adhesive layer 300, in such a manner that the starting and terminating ends of the windings of the respective coils are aligned with the through holes 21 formed in the rotor core 20. They are bonded fixedly to each other (FIG. 13F). As the adhesive, an anaerobic acryl-base bonding agent, a rubber-base bonding agent, or an acryl-base sticky film is to be used. After bonding, the holding sheet 3000 is removed. Since the coils 201, 202, 203, 204 and 205 and the short-circuit rings 206 and 207 are lined with the flexible insulating layer 1000 so as to keep the positional relation between the turns of the winding of each coil unchanged, they can be positioned easily and accurately relative to the rotor core 20 by means of an automatic machine or the like.

Figures 13G, 13H:
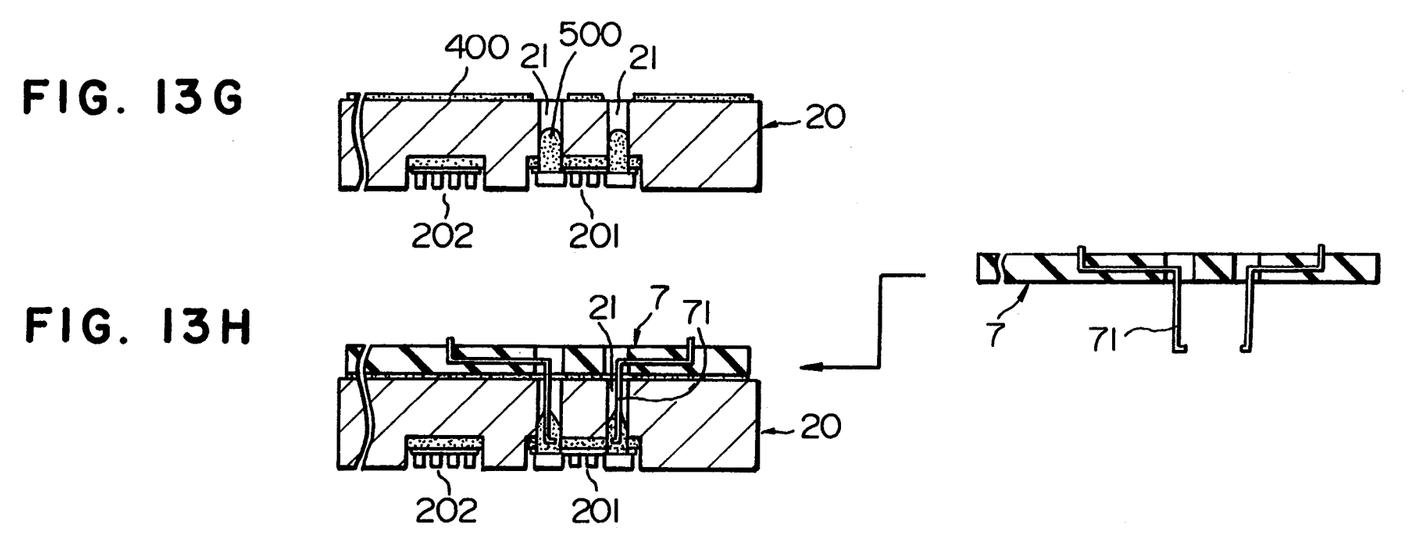
Figure 13I:
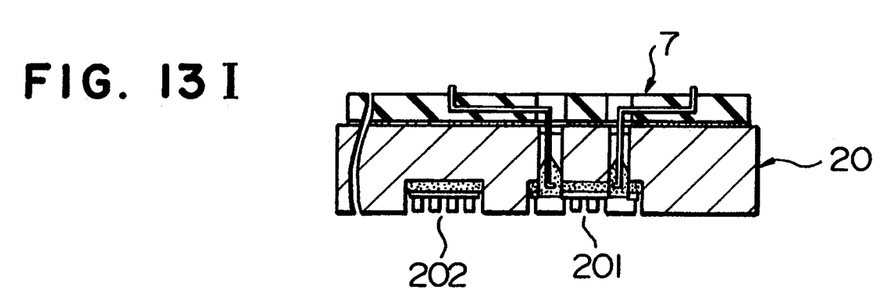

An adhesive 400 such as an anaerobic acryl-base bonding agent, a rubber-base bonding agent or an acryl-base sticky film is applied onto the surface of the rotor core 20 opposite from the coils and, furthermore, a conductive resin 500 is applied into a plurality of pairs of through holes 21 formed in the rotor core 20 at the positions corresponding to the starting and terminating ends of the winding of each of the coils (FIG. 13G).

The insulating member 7, holding the conductive junction members 71 and made of a high molecular compound such as polyphenylene sulfide or liquid crystal polymer, is positioned relative to the rotor core 20 and fixedly bonded thereto in such a manner that the conductive junction members 71 are allowed to extend in the pairs of through holes 21 formed in the rotor core 20 (FIG. 13H). This relative positioning can be performed easily and accurately by means of an automatic machine or the like, as well.

Figure 10:
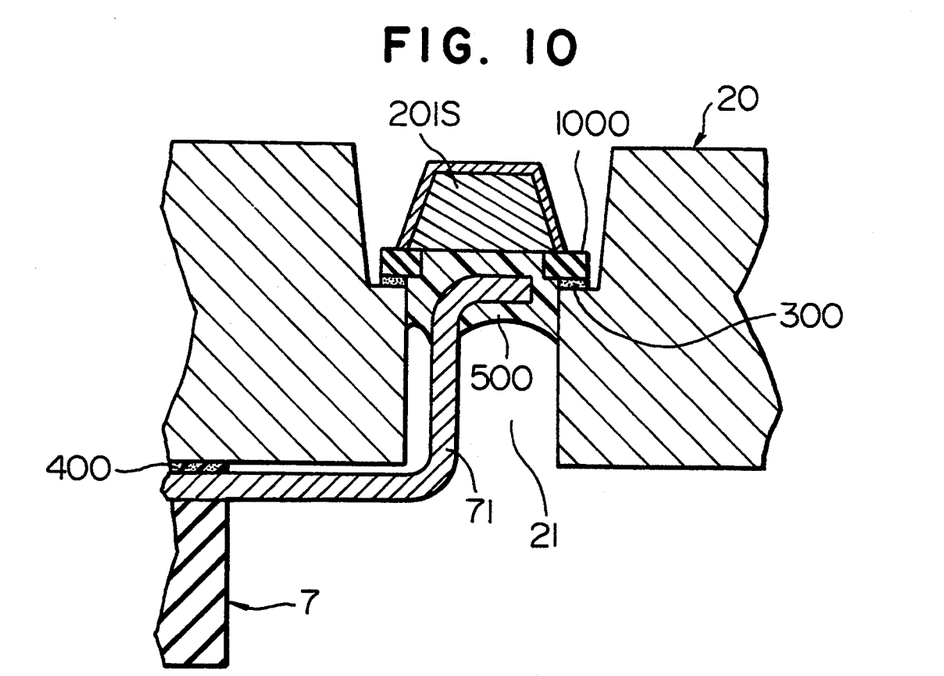
FIGS. 10 and 11 are sectional views, each showing the manner of connection between the coil and the junction member.

At the same time, the resin 500 is melted so as to electrically connect the junction members 71 to the starting and terminating ends of the winding of each of the coils 201, 202, 203, 204 and 205 (FIG. 10 shows the state of connection in detail). A plurality of channels can be connected simultaneously. In this case, by adopting the resin 500 the melting point of which is lower than that of the flexible insulating layer 1000, preferable about 200° C., it is possible to suppress the effect of heat on the adhesive layer and other components.

Figure 8:
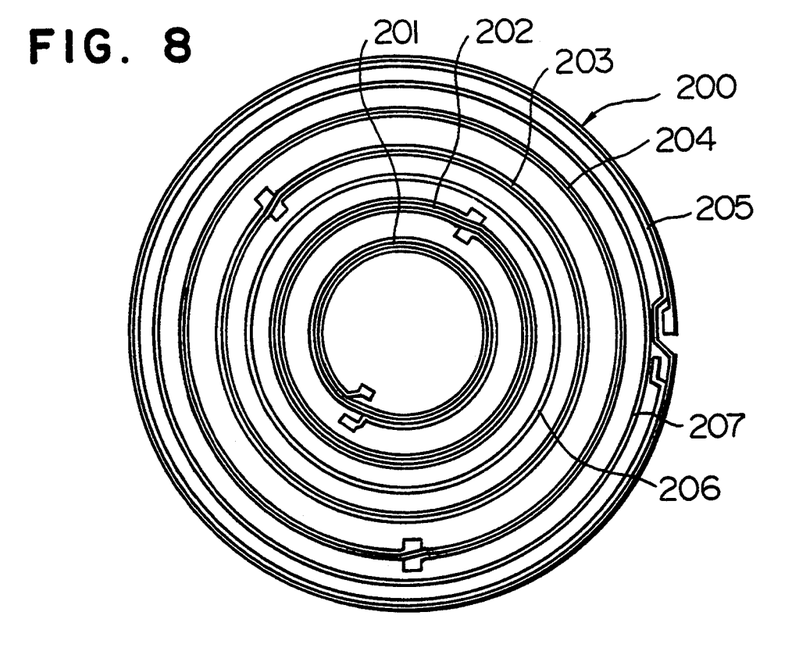
FIGS. 8 and 9 are plan views showing, respectively, coil patterns used in a rotor and in a stator of a rotary transformer of a rotary magnetic head apparatus according to one embodiment of the present invention.
Figure 9:
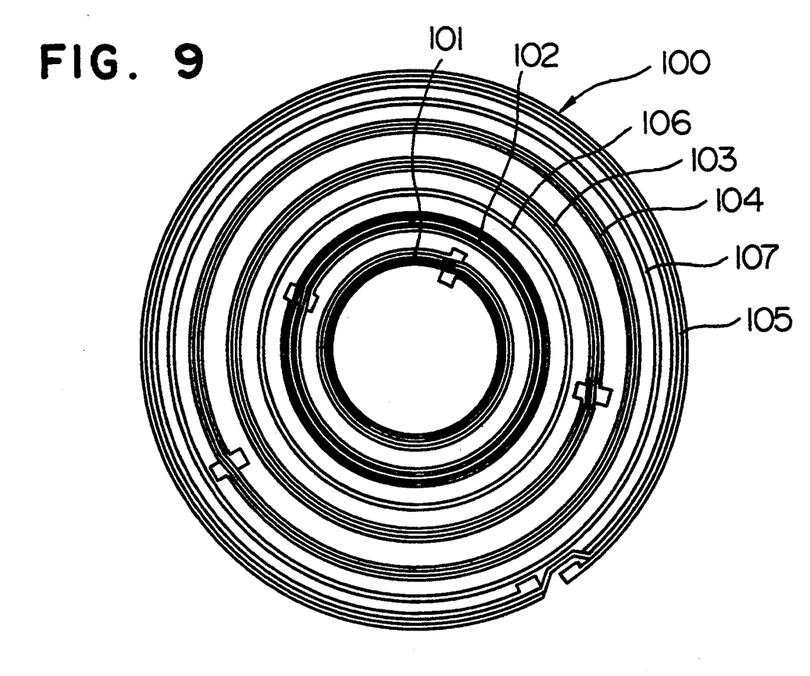

As shown in FIGS. 8 and 9, in the coil patterns used in the rotor and the stator of the rotary transformer of a rotary magnetic head apparatus according to one embodiment, the outermost pair of through holes are not arranged symmetrically in the radial direction with respect to the middle circle of the groove differently from other pairs of through holes. The outside through hole of the outermost pair of through holes is provided slightly inward in the radial direction with respect to the middle circle of the outermost groove so as to be located on the circumference of the outermost coil. In addition, the winding of the coil is curved, this prevents the core from being reduced in thickness at a portion thereof between the outermost pair of through holes and the outermost peripheral portion of the core, and therefore, there is no possibility that this portion is cracked or broken during the core manufacturing process. It is suitable to manufacture the core of such special form by means of injection molding.

Figure 11:
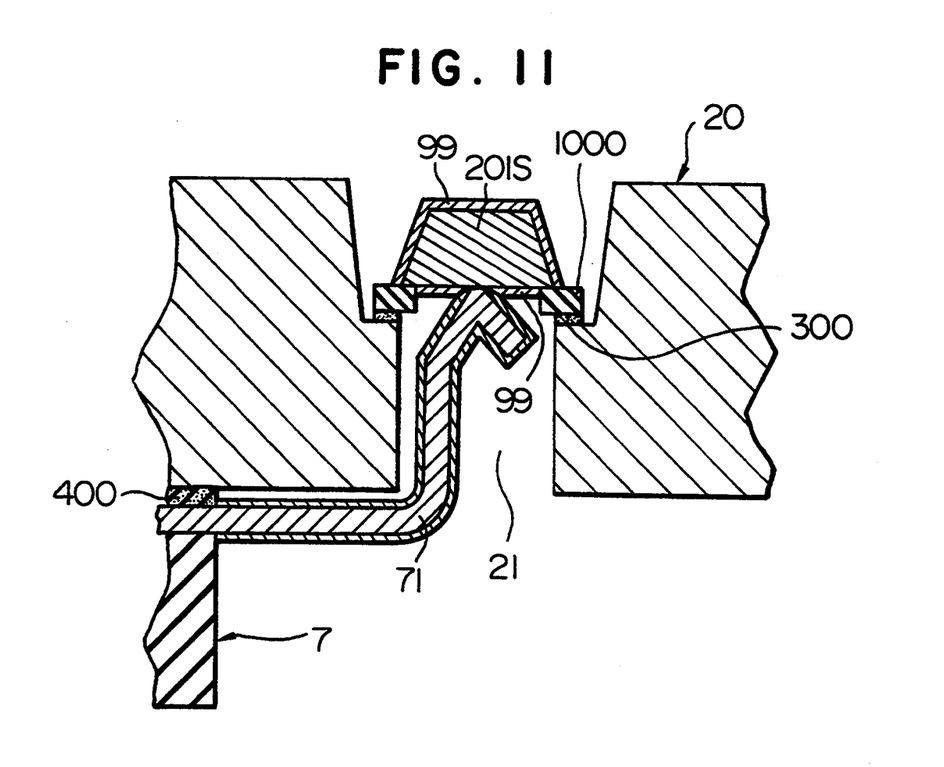

FIG. 11 shows a modification of the manner of making electric connections between the junction members and the starting and terminating ends of the winding of the coil. Unlike the coil of FIG. 10, the starting (or terminating) end of the winding of the coil is formed with a plated film 99 of metal such as Ni or Au, not only on the surface thereof facing the junction member, but also on the other surface thereof from which the flexible insulating layer 1000 is removed. The conductive junction member 71, 81 is bent at its tip end and coated with the plated film 99 of metal such as Ni or Au. As a consequence, the tip end of the junction member 71, 81 is brought into elastic contact with the starting or terminating end of the winding of the coil due to its spring force so as to be electrically connected to the same. In this case, the adhesive layer and other components are independent of heat. In regard this, in case that copper wire is used as the coil material, it readily rusts away. Accordingly if a substantial whole surface of such coil is coated with the plated film, it can prevent the coil from rusting away and suppress the transmission loss in a lower frequency band due to reduction of direct current resistance.

Figure 12:
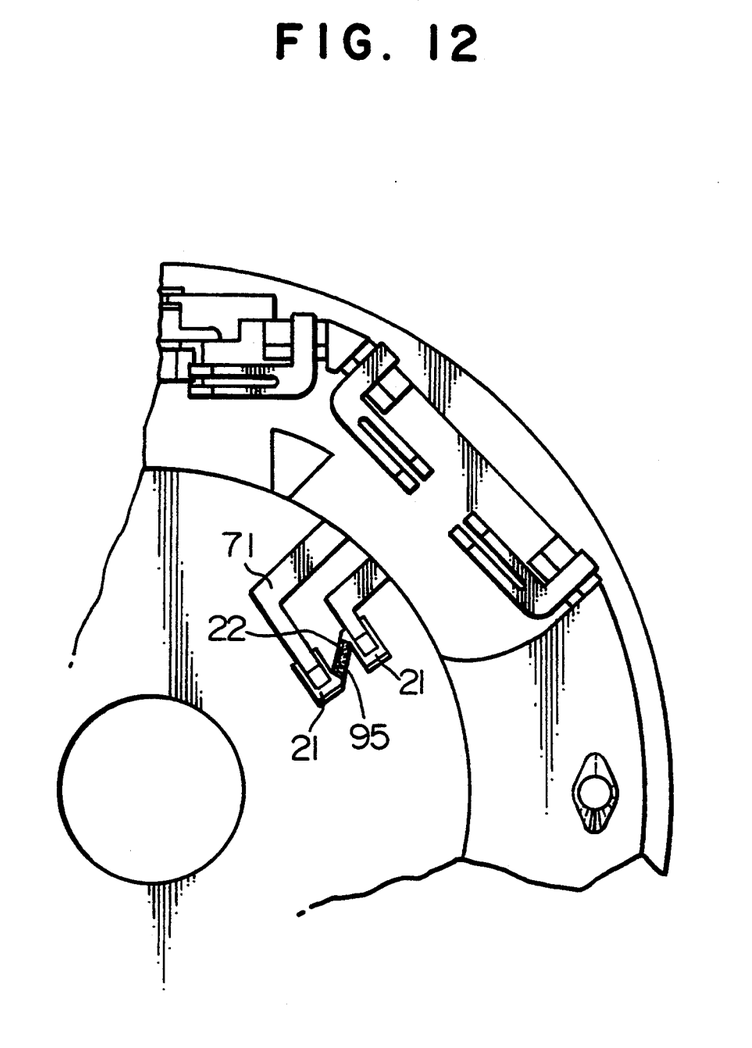
FIG. 12 is a fragmentary enlarged plan view showing through holes of the core.

Further, in the case which the through holes 21 of each pair are formed in the core in communication with each other, as shown in FIG. 12, for the purpose of improving the characteristics of the rotary transformer of the rotary magnetic head apparatus, an insulating member 95, made of a material which is foamed by heat, is disposed in a communicating portion 22 in order to prevent the junction members from being short-circuited through the conductive resin filled in the through holes.

What is claimed is:

1. A rotary magnetic head apparatus comprising:
   a transformer core including a rotor core and a stator core;
   a rotary drum having said rotor core secured thereto;
   a stationary drum having said stator core secured thereto and positioned so that said stator core faces said rotor core;
   at least one of a surface of said rotor core facing said stator core and a surface of said stator core facing said rotor core having a plurality of grooves formed concentrically therein;
   a plurality of magnetic heads provided in the outer peripheral portion of said rotary drum;
   a multi-winding signal transmission coil disposed in each of the plurality of grooves for transmitting signals to and from said magnetic heads;
   a flexible insulating layer lining a single surface of each of said coils and maintaining mutual positional relationships among the windings of each of said coils, while leaving exposed at least one other surface of each of said coils, said insulating layer being absent from each coil at starting and terminating end portions thereof;
   an adhesive layer between the bottoms of said grooves and said insulating layer and bonding said insulating layer to the bottoms of said grooves so as to affix each coil in a respective groove;
   said transformer core having through holes formed therein at positions corresponding to the starting and terminating end portions of each of said coils; and
   conductive junction members extending in said through holes and electrically connected to the starting and termination end portions of said coils to transmit signals to and from said magnetic heads.

2. A rotary magnetic head apparatus according to claim 1, further comprising a conductive resin forming connections between said coils and said conductive junction members, and wherein the grooves communicate with each other as a continuous groove.

3. A rotary magnetic head apparatus according to claim 2, wherein a pair of said through holes formed in said transformer core at positions corresponding to the starting and terminating end portions of one of said coils communicate with each other, and an insulating member is disposed between said pair of through holes to prevent a short circuit between said conductive junction members connected respectively to the starting and terminating end portions of said one of said coils.

4. A rotary magnetic head apparatus according to claim 2, wherein said flexible insulating layer is made of a high molecular compound, and the melting point of said flexible insulating layer is higher than that of said conductive resin.

5. A rotary magnetic head apparatus according to claim 1, wherein each of said conductive junction members is resilient and is bent so that said coils and said conductive junction members are connected to each other by said conductive junction members contacting the starting and terminating end portions of the windings of said coils due to the resiliency of said conductive junction members.

6. A rotary magnetic head apparatus according to claim 1, wherein the through holes are located on the respective circumferences of said coils.

7. A rotary magnetic head apparatus according to claim 1, further comprising an insulating holding member bonded to a surface of at least one of said rotor core and said stator core remote from said surfaces thereof facing each other, for maintaining a prescribed positional relationship between a pair of said conductive junction members for one coil.

8. A rotary magnetic head apparatus according to claim 7, wherein each of said conductive junction members is in the form of a pin.

9. A rotary magnetic head apparatus according to claim 1, wherein the exposed surface of each of said signal transmission coils disposed in said grooves is coated with metal.

10. A rotary magnetic head apparatus comprising:
   a transformer core including a rotor core and a stator core;
   a rotary drum having said rotor core secured thereto;
   a stationary drum having said stator core secured thereto and positioned so that said stator core faces said rotor core;
   at least one of a surface of said rotor core facing said stator core and a surface of said stator core facing said rotor core having a plurality of grooves formed concentrically therein;
   a plurality of magnetic heads provided in the outer peripheral portion of said rotary drum;
   a plurality of signal transmission coils disposed in the plurality of grooves and serving to transmit signals to and from said magnetic heads;
   a flexible insulating layer positioning and lining windings of each of said coils so as to maintain mutual positional relationships among the windings of each of said coils unchanged, said insulating layer being removed from each coil at portions thereof corresponding to starting and terminating ends of the winding thereof;
   an adhesive layer bonding said insulating layer to the bottoms of said grooves;
   said transformer core having through holes formed therein at positions corresponding to the starting and terminating end portions of the winding of each coil;
   conductive junction members extending in said through holes and electrically connected to the starting and terminating end portions of the windings of said coils to transmit signals to and from said magnetic heads; and
   an insulating holding member bonded to a surface of at least one of said rotor core and said stator core remote from said surfaces thereof facing each other, for maintaining a prescribed positional relationship between a pair of said conductive junction members for one coil.

11. A rotary magnetic head apparatus according to claim 10, wherein each of said conductive junction members is in the form of a pin.

* * * * *